United States Patent [19]

Hartman

[11] 3,909,463

[45] Sept. 30, 1975

[54] GRAFTED BLOCK COPOLYMERS OF SYNTHETIC RUBBERS AND POLYOLEFINS

[75] Inventor: Paul F. Hartman, Wayne, N.J.

[73] Assignee: Allied Chemical Corporation, New York, N.Y.

[22] Filed: Feb. 2, 1972

[21] Appl. No.: 228,418

Related U.S. Application Data

[63] Continuation of Ser. No. 780,165, Nov. 29, 1968, abandoned, which is a continuation-in-part of Ser. No. 690,758, Dec. 15, 1967, abandoned.

[52] U.S. Cl. ......... 260/2.5 F; 260/2.5 HA; 260/38; 260/845; 260/846; 260/848; 260/888; 260/897 A
[51] Int. Cl.² ...................... C08L 23/28; C08L 9/06; C08L 61/16
[58] Field of Search ............. 260/845, 846, 848, 38, 260/41.5, 2.5 F, 888, 897 A

[56] References Cited
UNITED STATES PATENTS

| | | | |
|---|---|---|---|
| 3,122,519 | 2/1964 | Baum | 260/848 |
| 3,287,440 | 11/1966 | Giller | 260/846 |
| 3,296,333 | 1/1967 | White | 260/848 |
| 3,336,244 | 8/1967 | Rockoff | 260/848 |
| 3,402,140 | 9/1968 | Bickel et al. | 260/848 |
| 3,489,697 | 1/1970 | Brice | 260/2.5 |
| 3,534,119 | 10/1970 | Relyea | 260/848 |

FOREIGN PATENTS OR APPLICATIONS

| | | | |
|---|---|---|---|
| 987,827 | 3/1965 | United Kingdom | 260/848 |

*Primary Examiner*—John C. Bleutge
*Attorney, Agent, or Firm*—Roger H. Criss; Michael S. Jarosz

[57] ABSTRACT

Grafted block copolymers of polyolefins and synthetic rubbers are prepared by mixing and heating a polyolefin such as polyethylene and a synthetic rubber such as butyl rubber in the presence of a bifunctional phenolic compound which acts as a grafting vehicle.

22 Claims, No Drawings

GRAFTED BLOCK COPOLYMERS OF SYNTHETIC RUBBERS AND POLYOLEFINS

CROSS-REFERENCE TO RELATED APPLICATION

This is a continuation of application Ser. No. 780,165, filed Nov. 29, 1968, which in turn is a continuation-in-part of application Ser. No. 690,758, filed Dec. 15, 1967 both now abandoned.

BACKGROUND OF THE INVENTION

This invention relates to the preparation of grafted block copolymers of synthetic rubbers and polyolefins.

Polyethylene is a well known and extensively used synthetic polymer having a wide variety of uses. Processes for producing polyethylene are disclosed, for example, in U.S. Pat. Nos. 2,825,721 and 2,949,447. However, polyethylene, especially the higher density polyethylenes, is subject to certain limitations which render the same unsuitable for certain applications. For example, polyethylenes are often brittle and substantially inextensible. Also, polyethylene is undesirably susceptible to stress cracking and also tends to be deficient in impact strength. Polymers of propylene and butene-1 are subject to similar limitations. Additionally, most polyethylenes tend to be incompatible or incapable of holding significant amounts of certain filler materials, such as carbon black, talc, and the like.

SUMMARY OF THE INVENTION

In accordance with the present invention, modified olefin polymers which are grafted block copolymers are provided by mixing and heating: A) At least about 40 parts by weight of an unsaturated olefin polymer selected from the group consisting of polyethylene, polypropylene, polybutene-1 and copolymers thereof, preferably polyethylene; B) up to 60 parts by weight of an unsaturated, uncured synthetic rubber, preferably a butyl rubber; and C) a minor amount of a bifunctional phenolic material which acts as a grafting vehicle. The copolymers of the present invention contain the polyolefin in an amount of at least about 50 parts by weight and correspondingly up to about 50 parts of the synthetic rubber grafted to said polyolefin by a residue of the bifunctional phenolic material.

DETAILED DESCRIPTION

By the invention, copolymers, especially polyethylene copolymers, may be produced having markedly improved and high capacity for fillers, including carbon black, talc and the like, superior to both polyethylene and physical blends of the polyolefin and the synthetic rubber. Grafted block copolymers may be produced which are also superior and improved over the polyolefins with respect to one or more of the desired properties of tensile strength, stress cracking, extensibility, and impact strength. The copolymers are useful in one or more of a variety of applications, including, by way of example, floor tile, wire jacketing, wire coating or other application where good ozone resistance is desirable. The copolymers may also be employed to produce plastic foams, as hereinafter described.

The term "unsaturated olefin polymer," as used herein, means an olefin polymer containing at least one double bond per average molecule. Unsaturation is conventionally measured by infrared analysis and for polyolefins is expressed in terms of percent by weight. Since a terminal ethylene group has a molecular weight of 27, the number of double bonds per average molecule may be calculated by dividing the percent by weight unsaturation (divided by 100) by 27 and multiplying the quotient by the number average molecular weight. For example, an olefin polymer having a number average molecular weight of 27,000 and a percent by weight unsaturation, as measured by infrared analysis, of 0.1% has one double bond per average molecule. The polyolefins to which the invention is applied usually have unsaturation between about 0.01 to 1%, and preferably between about 0.05 to 0.5%.

The preferred olefin polymer is polyethylene containing no more than about 3% of another alpha-olefin copolymerized therewith. The polyethylene can be either of the low or high density type and prepared by any of the so-called low, intermediate and high pressure polymerization processes, which are, of course, well known.

The advantages of filler loading capacity are more particularly derived from the grafted block copolymers produced from the higher density ethylene polymers having density of at least about 0.94. Such polyethylenes are described, for example, in U.S. Pat. Nos. 2,949,447 and 2,825,721. In addition to accepting substantial amounts of filler, the grafted block copolymers prepared from the higher density polyethylenes generally have higher tensile strengths and higher elongations than physical blends of the polyethylene and the synthetic rubber. Higher zero strength temperature and improved stress cracking resistance may be also provided.

Graft block copolymers prepared from low density polyethylene have higher ultimate tensile strength than corresponding physical blends. These copolymers are of particular interest because of their many resemblances to plasticized compositions, such as plasticized vinyl resins.

Polymers of propylene and butene-1 employed in the invention are desirably those having an isotactic content of at least about 50% by weight.

The olefin polymer preferably has a molecular weight of at least 8,000 and more preferably at least 20,000. Lower molecular weight polymers, being generally waxy and low in unsaturation, tend to produce compositions not having the desirable properties sought to be achieved by this invention.

As used herein, the term "synthetic rubber" is used in the well known sense to define a synthetic resin having a stress-strain curve characteristic of elastomeric materials. Uncured synthetic rubber suitable for this invention are those which are unsaturated, i.e., have at least one double bond per molecule. The one double bond is required to provide a site for grafting, but the requirement is readily met by most commercially available synthetic rubbers, which normally have in excess of 1% unsaturation.

It is the custom in the art to express the degree of unsaturation of synthetic rubbers in terms which are different from the terms used to express the degree of unsaturation of polyolefins. The degree of unsaturation of synthetic rubbers is customarily expressed in terms of weight percent of the units in the polymer chain which contain a double bond, the units in the polymer chain which contain a double bond, the units corresponding to the appropriate monomer. For example, butyl rubber which is a copolymer of 98% isobutylene and 2% isoprene and which has 1.4% unsaturation contains 1.4 weight percent isoprene units in the polymer chain which contain a double bond. In describing this invention, the custom of the art is followed in expressing the degree of unsaturation of synthetic rubbers. However, the comparison made in the following paragraph between the degree of unsaturation of the synthetic rubber with the degree of unsaturation of the polyolefin is made on the common basis of weight of ethylene units, the terms in which the unsaturation of polyolefins is expressed.

The degree of unsaturation of the synthetic rubber is preferably greater than that of the polyolefin. Particularly good results are obtained using synthetic rubbers having a degree of unsaturation which is from 3 to 10 times as great as that of the polyolefin. Such synthetic rubbers have from 1 to 5% unsaturation. Synthetic rubber having more than 10 times as much unsaturation as the polyolefin may be used, but with less efficient grafting in terms of percent rubber grafted based on total rubber in the composition. Also, highly unsaturated rubbers tend to cross-link rather than graft to the polyolefin. However, these effects may be compensated for by reducing the amount of synthetic rubber added to the reaction mixture, so that synthetic rubbers having as much as 100% unsaturation may be used.

Synthetic rubbers having the preferred degree of unsaturation include the well known butyl rubbers produced by copolymerization of an isoolefin with a minor portion of a conjugated diolefin. Generally, the isoolefins have 4 to 7 carbon atoms, and include, by way of example, isobutylene and ethyl methyl ethylene, the more preferred monomer being isobutylene. Suitable diolefins usually have 4 to 8 carbon atoms and include, by way of example, isoprene, butadiene, piperylene, 2,3-dimethyl-1,3-butadiene, 3-methyl-1,3-pentadiene, 2-methyl-1,3-pentadiene, 1,3-hexadiene, and 2,4-hexadiene, isoprene being preferred. The butyl rubbers contain only a minor amount of the diolefin, usually not in excess of about 15% by total weight, more usually between 1% to 8%.

Other synthetic rubbers which can be employed in the invention include the well known polymers of butadiene and styrene containing 50 to 95% butadiene, more usually 60 to 85% butadiene, including the Buna S rubbers, and the polymer of butadiene and acrylonitrile containing 40 to 95% butadiene, more usually 60 to 85% butadiene, including the Buna N rubbers. Grafting to polyethylene with good efficiency is also obtained with rubbers known as ethylene-propylene terpolymers, which are terpolymers of ethylene, propylene and a diolefin. There may also be employed similarly modified polymers of the types indicated above and also substantially homopolymer synthetic rubbers such as the poly-cis, 1-4 butadiene rubbers obtained commercially under the trademark "Diene."

The bifunctional phenolic compounds employed in the invention may be essentially either monomeric bifunctional phenols or polymeric bifunctional phenols, in either case having their functionality in the ortho positions with the para position substituted with an essentially inert substituent, such as alkyl, alkylaryl or arylalkyl radical of up to about 16 carbon atoms, preferably 4 to 12 carbon atoms. The more preferred phenolic compounds are the polymeric or so-called condensed bifunctional phenolic compounds. The ortho functionality of the suitable phenols is usually provided by a hydroxy or halogen substituent, the latter preferably being chlorine or bromine.

Preferred monomeric bifunctional phenols include the phenol dialcohols and halogen derivatives thereof, the phenol dialcohols being well known and typically prepared by reaction of a para-substituted phenol with an excess of an aldehyde, preferable formaldehyde, in the presence of an alkali. Preparation of such dialcohols is described in U.S. Pat. No. 1,996,069 to Honel and in U.S. Pat. No. 2,364,192 to Carlton et al. The phenol dialcohols are distinguished from the phenols not containing ortho groups such as methylol groups, those not containing such groups being typically prepared in acidic medium with reduced amounts of aldehyde. The suitable phenol dialcohols are also distinguished from those not having an inert substituent in the para position and which react in all three positions to form insoluble, infusible thermosetting resins. The para-substituted phenol dialcohols employed in the present invention therefore contain only two reactive groups and therefore undergo only linear condensation. Examples of monomeric phenol dialcohols include 2,6-dimethylol-4-tert. butyl phenol; 2,6-dimethylol-4-octyl phenol; 2,6-dimethylol-4-phenyl phenol; 2,6-dimethylol-4-benzyl phenol; 2,6-dimethylol-4-(alpha, alpha-dimethylbenzyl) phenol; 2,6-dimethylol-4-dodecyl phenol; and 2,6-dimethylol-4-cyclohexyl phenol.

The polymeric bifunctional phenols most preferably employed in the invention may be considered condensation polymers of the phenol dialcohols. Preparation of the polymeric bifunctional phenols from para-substituted phenols and aldehydes is described, for example, in The Carswell Volume entitled "Phenoplasts," Interscience Publishers, New York, 1947, especially on pages 17-22. The halogen substituted bifunctional phenols are also especially suitable and may be prepared by halogenation of the polymeric phenols by conventional methods. The halogenated phenols, especially the brominated polymeric phenols, are generally preferred because of their high activity by themselves without use of catalyst. An example of an especially preferred compound is a brominated hydroxymethylphenol having the following approximate structural formula:

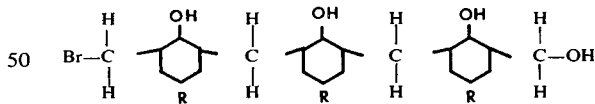

The above monobromo phenolic compound as prepared by conventional procedures is typically in admixture with minor amounts of the dibrominated product and dihydroxymethyl phenol starting material. The higher activity of the halogenated phenols is believed to be attributable to the release of acidic hydrogen halide during the grafting reaction. This is supported by the fact that the somewhat slower acting hydroxymethyl phenols are faster in grafting in an acidic reaction system. It will thus be evident that an acidi catalyst including acid salts may be added as accelerators if desired when employing the dihydroxyalkyl phenols. Examples of such acid catalysts include p-toluene sulfonic acid and stannous chloride and zinc chloride.

The amount of the bifunctional phenol employed in the present invention may vary fairly widely between about 0.3% to 15% by total weight of the polyethylene and rubber to be grafted thereto, depending largely on the amount of rubber in the reaction mixture. Generally an amount of at least 0.3% is required to effect any substantial degree of grafting to the polymer substrate. Amounts substantially in excess of about 15% are unnecessary and tend to cause undesirable cross-linking of the rubber. The amount of the phenolic compound preferably is between about 1 to 8% by total weight of the substrate polymers.

The copolymers of the invention containing 1% to 50% grafted synthetic rubber by total weight of copolymer are prepared from mixtures containing between 1 to 60% by weight of the rubber. Mixtures containing about 1–30% rubber will generally graft substantially completely to provide grafts containing rubber required to effect desired modifications and improvement in the properties of the polyolefin. Mixtures containing in excess of about 60% of the rubber tend to substantially reduce the efficiency of the graft because of the tendency of the grafting diphenol to react more readily with the more highly unsaturated rubber to produce products containing undesirably large amounts of cross-linked rubber and ungrafted polyolefin. The more highly unsaturated rubbers are preferably employed in less than maximum amounts because of the same tendency of the rubber to compete for the grafting diphenol and become crosslinked.

It is also generally desirable that at least about 20% of the total rubber in the reaction mixture become grafted to the polyolefin to produce products in which the improved properties of the graft copolymer are advantageously exhibited compared to physical blends of the polyolefin with either the uncured or cross-linked rubber. The more preferred reaction mixtures contain between about 10 to 55% of the synthetic rubber to produce the preferred copolymer containing 5 to 50% by weight of grafted rubber.

The grafted block copolymers may include various conventional additives, including pigments, dyes, fillers, plasticizers, extenders, stabilizers and the like. A feature of the copolymers of the invention is their ability to accept filler materials, especially of the particulate type, in relatively large amounts, ranging up to 150 parts per 100 parts of the graft copolymer, preferably between about 10 to 80 parts. The copolymer readily accepts relatively large amounts of fillers with which polyethylene itself has given the most difficulty. Such fillers include the various carbon blacks, talc, hydrated magnesium silicate, calcium silicate and alumina. Conductive carbon blacks are also compatible, making the graft copolymers suitable for producing so-called semiconductive compositions useful as capable coverings, floor tile and other products in which a degree of conductivity is desirable. In some situations the addition of additives such as carbon black may tend to reduce melt index and accordingly processibility of the filled composition. Addition of mineral oil and the like to such compositions but only improves processibility but also elongation and stress cracking resistance.

The copolymers of the invention may be prepared by heating a thorough mixture of the polyolefin, elastomer and bifunctional phenolic grafting vehicle at elevated temperatures sufficient to effect the grafting reaction. Mixing and reaction of the components may be carried out in most any conventional equipment including a two roll rubber mill, Banbury type mixer or extruder. The polyolefin and elastomer may be pre-blended with or without the phenolic material. In all procedures, intimate and thorough mixing of the components including the phenolic material is important to obtaining optimum results. The grafting reaction itself is generally effected by heating the mixed components, desirably while maintaining mixing, to a temperature from about 250°F. to 425°F. A temperature of at least about 250°F. is usually the minimum required to effect the grafting reaction, depending largely on the particular phenolic material employed. Temperatures substantially in excess of about 425°F. are avoided as tending to cause undesirable reactions, including a tendency on the part of the phenolic material to polymerize or condense with itself, thus denying the availability of this component for the grafting reaction. Preferred temperatures are in the range of about 300°F. to 375°F. Time for the grafting may vary widely depending on amount of rubber to be grafted and phenolic material as well as temperature employed, but is generally surprisingly short in the more preferred embodiments of the invention. Thus, substantial grafting can be effected in as little as one minute at the higher temperatures and higher proportions of rubber and phenolic material. Times in excess of about 30 minutes may be employed but usually provide no additional advantage or grafting and hence are unnecessary as a practical matter. In the more preferred embodiments the mixture is at the grafting temperature for between about 5 to 20 minutes. Additives such as fillers may be admixed with the compositions of the invention either before, during or after the grafting reaction. Such procedure produces products having apparently lower melt indexes but showing lower torque as measured in a standard Plastograph.

It has been also found in accordance with the present invention that the copolymers of the invention are surprisingly useful in forming plastic foam in contrast to polyethylene by itself, especially linear polyethylene, from which it has been difficult in the past to form fine cell materials. The preferred copolymers for foam use are the copolymers prepared from the lower density branched polyethylenes, e.g. those having a density less than about 0.94. Soft, resilient foams may be produced from such graft copolymers. Also especially useful for producing foam are mixtures of the grafted block copolymers with non-grafted polyethylene. For example, mixtures of the copolymers with linear high density polyethylene have been found to produce fine cell foam whereas the same linear polyethylene by itself results in substantially larger cell structures. Such mixtures may contain widely varying proportions of linear polyethylene and copolymers, for example, between about 5 to 90% by weight of the copolymer, preferably between about 8 to 75% of the copolymer, based on the total weight of the copolymer and linear polyethlene. Such mixtures may be employed to give better forms than those prepared from only the copolymer.

The copolymers and polyethylene mixtures therewith may be formed into foam employing known procedures for the production of plastic foams from such materials. Conventional blowing agents may be employed, including, by way of example, azodicarbonamide and the fluorine-containing hydrocarbons. Foam densities between about 0.1 to 0.6 may be readily obtained. Best results are obtained when extruding the foamable compositions by providing good mixing and adequate time to control temperature. This may be accomplished in extrusion by connecting two extruders in series to effect a longer residence time and assure good mixing. Extrusion mixing temperatures are preferably within the range of about 350°F. to 450°F., with extrusion die temperatures being more preferably controlled between 250°F. to 325°F. The polyethylene graft copolymers may be continuously extruded as fine filaments to produce foam rods having diameters up to about ½ inch or even more and densities usually between about 0.1 to 0.6 g/cc.

The following examples, in which parts and percentages are by weight unless otherwise noted, demonstrate the practice and advantages of the present invention.

EXAMPLE 1

A commercial polyethylene copolymer containing about 2.0% butene-1 and having about 0.3% unsaturation, density of about 0.95 and molecular weight corresponding to a Melt Index of 0.4 was intimately mixed in amounts of 70 parts on a two roll rubber mill at a temperature of about 300°F. with 30 parts of butyl rubber obtained under trademark "Enjay 268" containing about 1.4% unsaturation and comprising a copolymer of about 98% isobutylene and 2% isoprene. The blended material was sheeted out from the rubber fill and cut into small ¼ inch pieces which were recharged to the rubber mill along with 3.5 parts of bifunctional phenolic resin comprising a normally solid brominated reaction product of p-methylphenol and formaldehyde and obtained commercially under the trademark SP-1055. Mixing was continued on the rubber mill for about 15 minutes at a temperature of about 350°F. and the product discharged as a sheet, which was cut into ¼ inch pieces. Substantially the entire product dissolved in boiling xylene, demonstrating the absence of cross-linked polyethylene or cured butyl rubber. The xylene solution was cooled to room temperature to precipitate the product which was recovered by filtration. The product was purified by two additional treatments involving dissolution and recovery in xylene. Samples of the purified product were analyzed by infrared absorption and were found to be a copolymer containing 71% polyethylene and 29% butyl rubber with minor portion of phenolic resin residue. Evaluation of the produce showed the properties given in Table I along with a side-by-side comparison with the starting polyethylene.

Table 1

|  | Starting Polyethylene | Copolymer |
| --- | --- | --- |
| Tensile Strength at Yield, p.s.i. | 3900 | 1720 |
| Tensile Strength at Break, p.s.i. | 3900 | 2460 |
| Elongation at Break, % | 70 | 840 |
| Melt Index | .4 | 0.02 |

EXAMPLE 2

Example 1 is repeated except that the amount of the same polyethylene was 87 parts and the amount of the same butyl rubber 13 parts. Analysis of the resulting product showed 14% butyl rubber grafted by infrared and the properties givven below in Table II.

Table II

|  | Starting Polyethylene | Copolymer |
| --- | --- | --- |
| Tensile Strength at Yield, p.s.i. | 3900 | 2675 |
| Tensile Strength at Break, p.s.i. | 3900 | 2840 |
| Elongation at Break, % | 70 | 1200 |
| Melt Index | .4 | 0.4 |

The graft of Example 2 readily accepted 30 to 40 parts of carbon black to give compositions having good tensile strengths and elongation.

EXAMPLE 3

Employing equipment and components the same as in the preceding examples a carbon black filled graft copolymer was prepared by preblending 80 parts of the polyethylene, 20 parts of butyl rubber, 4 parts of the bifunctional brominated phenolic resin and 40 parts of carbon black obtained under the trademark Continex HAF. The resulting blend was then heated at 350°F. for 20 minuts while mixing on the two roll rubber mill. The product was a copolymer having the properties given below in Table III wherein for comparative purposes there is also given properties for a physical blend of the same blend prepared without the phenolic resin.

Table III

|  | Physical Blend | Copolymer |
| --- | --- | --- |
| Tensile Strength at Yield, p.s.i. | 2080 | 3020 |
| Tensile Strength at Break, p.s.i. | 2080 | 2200 |
| Elongation, % | 10 | 150 |
| Melt Index (High Load) | 14.7 | 5.1 |

EXAMPLE 4

Commercial low density polyethylene having density of about 0.915 and unsaturation of about 0.11% was mixed in an amount of 70 parts with 30 parts of the butyl rubber of the preceding examples and 3 parts of the brominated phenolic resin of said examples and the resulting mixture then heated at a temperature of 300°F. for 10 minutes in accordance with the general procedure of Example 3. The product after solvent purification was found to contain 26% butyl rubber grafted therein by infrared analysis. The graft copolymer had a high load melt index of 1.6, tensile strength at yield of 666 p.s.i., tensile strength at break of 1520 p.s.i., and elongation at break of 640%.

EXAMPLE 5

Example 4 was repeated except tht amount of polyethylene was 90 parts, the amount of butyl rubber 10 parts, and the amount of phenolic resin 1 part. The product was found to be a copolymer 9.5% grafted butyl rubber, and having high load melt index of 23, tensile strength at yield of 935 p.s.i., tensile strength of break of 1725, and elongation at break of 850%.

EXAMPLE 6

The high density polyethylene employed in Example 1 in an amount of 75 parts was mixed with 25 parts of a low density polyethylene of density of 0.917, 10 parts of the butyl rubber of Example 1, and 2 parts of the brominated phenolic resin of previous examples. This mixture was then heated at a temperature of 300°F. for 10 minutes and the product after solvent purification was found to be a copolymer having a high load melt index of 14 and containing 8.2% grafted butyl rubber. The graft copolymer also has a tensile strength at yield of 2380 p.s.i., a tensile strength at break of 2480 p.s.i. and elongation at break of 855%.

EXAMPLE 7

The polyethylene of Example 1 in an amount of 80 parts was mixed with 20 parts of an ethylene-propylene terpolymer rubber obtained commercially under the trademark designation EPT 3509 and having 2.7% unsaturation, and also 2.5 parts of the brominated phenolic resin employed in Example 1. The resulting mixture was then heated as in Example 3 at a temperature of 350°F. for 15 minutes and there was recovered after solvent purification a block copolymer containing 10.6% of ethylene-propylene terpolymer grafted to the polyethylene. The copolymer had a high load melt index of 8.5, yield tensile strength of 2090 p.s.i., tensile strength at break of 3505 p.s.i., and elongation at break of 705%.

EXAMPLE 8

The polyethylene of Example 1 in an amount of 85 parts was mixed with 1.5 parts of a so-called "nitrile" rubber obtained under the trademark HYCAR 1411 and comprising a copolymer of about 61% butadiene and 39% acrylonitrile and having about 60% unsaturation, and also 3 parts of the phenolic resin employed in Example 1. The mixture was then heated at 350°F. for about 15 minutes and there was recovered after solvent purification a block copolymer containing 8.5% of the nitrile rubber grafted to the polyethylene. The graft copolymer had a melt index of 0.4, yield tensile strength of 2330 p.s.i., tensile strength at break of 1950 p.s.i., elongation of 60% and excellent retention of properties when filled with 30 parts of carbon black as compared to performance of a physical blend of the polyethylene and nitrile rubber in similar proportions.

EXAMPLE 9

The polyethylene of Example 1 in an amount of 91 parts was mixed with 9 parts of a cis-1,4-butadiene polymer rubber obtained under the trademark DIENE and having 98–100% unsaturation, and also 3.9 parts of the phenolic resin employed in Example 1. The mixture was then heated to 350°F. for 15 minutes and there was recovered after solvent purification a block copolymer containing 2.2% of the rubber grafted to the polyethylene. The copolymer had a melt index of 0.5, yield tensile strength of 2760 p.s.i., tensile strength at break of 1950, and elongation at break of 460%. The copolymer also had excellent retention of properties when filled with 30 parts of carbon black as compared to performance of a physical blend of the polyethylene and rubber in similar proportions.

EXAMPLE 10

The polyethylene of Example 1 in an amount of 91 parts was mixed with 9 parts of an SBR copolymer rubber comprising a copolymer of about 77% butadiene and about 23% styrene, and having about 77% unsaturation, and also with 3.9 parts of the phenolic resin employed in Example 1. The mixture was heated at 350°F. for 15 minutes and there was recovered after solvent purification with xylene a block copolymer containing 3.5% of the SBR copolymer grafted to the polyethylene. The block copolymer had a melt index of 0.6, yield tensile strength of 3140 p.s.i., tensile strength at break of 2000 and elongation at break of 340%. The copolymer also had excellent retention of properties when filled with 30 parts of carbon black as compared to performance of a similarly filled physical blend of the polyethylene and SBR copolymer in similar proportions.

EXAMPLE 11

To 125 ml. of sodium hydroxide solution containing 12 grams (.3 mole) NaOH is added p-t-butylphenol (45 g., .3 mole) and 19 grams (.6 mole) of paraformaldehyde. The mixture is warmed gently with occasional shaking to 100°C. and kept at 100°C. for 1½ hours. The mixture is then cooled and neutralized with acetic acid. The precipitated resin is washed with 6–7 additions of water. About 65 grams of a soft taffy-like tancolored resin is obtained. The resin is next heated to 90° in a vacuum oven for 1½ hours to remove water, excess phenol and formaldehyde and to increase the degree of polymerization. The resulting p-t-butylphenol-formaldehyde resin is a clear amber brittle solid having a softening range of 53°–55°. Polyethylene of 0.95 density and melt index of 5 in an amount of 36 parts was admixed with 4 parts of the butyl rubber of Example 1 and 1.5 parts of the above prepared para-t-butylphenol-formaldehyde resin. There was also admixed 0.5 parts of stannous chloride dihydrate. The resulting mixture was then heated while mixing in a Plastograph to 325°F. for 15 minutes and there was recovered after solvent purification a block copolymer having melt index of 3.35 and containing 9.7% of butyl rubber grafted to the polyethylene.

EXAMPLE 12

Paraphenylphenol (51 g., .3 mole) is added to a solution of 12 grams sodium hydroxide in 200 ml. water. Nineteen grams (.6 mole) of paraformaldehyde is added and the mixture is stirred and heated at 100°C. for 2 hours. It is then cooled and neutralized with acetic acid. A granular resin is precipitated. It is washed 4–5 times with water and filtered. The dried resin melts at 85°–87°C. After 1½ hours in a vacuum oven at 90°C. a brittle amber p-phenylphenol-formaldehyde resin is obtained which melts at 68°–70°C. The polyethylene employed in Example 11 in an amount of 36 parts was mixed with 4 parts of the butyl rubber of Example 1 and 2 parts of the above prepared p-phenylphenol-formaldehyde resin. Also added was 0.5 part of stannous chloride dihydrate. The resulting mixture was admixed in a Plastograph at a temperature of 325°F. for 15 minutes and there was recovered after solvent purification a block copolymer having a melt index of 3.29 and containing 9.6% of the butyl rubber grafted to the polyethylene.

EXAMPLE 13

A commercial polypropylene having about 0.01% unsaturation, density of about 0.90 and molecular weight corresponding to a Melt Index of 4 was intimately mixed in amounts of 90 parts in a Brabender Plastograph at a temperature of about 375°F. with 10 parts of butyl rubber obtained under trademark Enjay 268 containing about 1.4% unsaturation and comprising a copolymer of about 98% isobutylene and 2% isoprene. To the blended material was added 5 parts of phenolic resin employed in Example 12. Mixing was coninued in the Plastograph for about 20 minutes at a temperature of about 375°F. and the product discharged. Substantially the entire product dissolved in boiling xylene, demonstrating the absence of crosslinked polypropylene or cured butyl rubber. The xylene solution was cooled to room temperature to precipitate the product which was recovered by filtration. The product was purified by two additional treatments involving dissolution and recovery in xylene. Samples of the purified product were analyzed by infrared-absorption and were found to be a block copolymer containing 5.3% butyl rubber with minor portion of phenolic resin residue. Evaluation of the product showed the properties given in Table IV.

Table IV

|  | Block Copolymer |
| --- | --- |
| Tensile Strength at Yield, p.s.i. | 3429 |
| Tensile Strength at Break, p.s.i. | 3381 |
| Elongation at Break, % | 341 |
| Melt Index | .81 |

EXAMPLES 14–18

Example 31 is repeated except that the amounts of the polypropylene, butyl rubber and phenolic resin were varied along with reaction conditions to give the tabulated amounts of butyl rubber grafted, as shown by infrared analysis.

| Example No. | 14 | 15 | 16 | 17 | 18 |
| --- | --- | --- | --- | --- | --- |
| Polypropylene | 90 | 80 | 80 | 80 | 90 |
| Butyl 268 | 10 | 20 | 20 | 20 | 10 |
| Super Beckacite 1001* | 2.5 | — | 2.5 | — | 1 |
| Schenectady SP-1055 | — | — | — | 2.5 | — |
| Phenolic Resin of Ex. 12 | — | 5 | — | — | — |
| Reaction Time, Mins. | 20 | 20 | 20 | 10 | 10 |
| Reaction Temp., °F. | 375 | 375 | 375 | 350 | 350 |
| Melt Index 230°C. | .82 | .448 | .41 | .95 (190°C.) | 2.0 |
| % Butyl Rubber Grafted | 7.1 | 9.4 | 9.8 | 3 | 2.4 |

*Trade name for phenolic resin similar to phenolic resin prepared in Example 11.

EXAMPLE 19

Example 13 is repeated except that the polypropylene is grafted to the ethylene-propylene terpolymer employed in Example 7 instead of butyl rubber and substantial grafting was found as shown by infrared analysis.

| Code | 2212-15B |
| --- | --- |
| Polypropylene | 90 |
| EPT - 3509 | 10 |
| Super Beckacite 1001 | 2.5 |
| Reaction temp., °F. | 375 |
| Reaction time, min. | 30 |
| Melt Index, 230°C. | 1.9 |
| % EPT grafted | 4.5% |

EXAMPLE 20

A low density polyethylene-butyl rubber grafted block copolymer prepared as in Example 4 was added in an amount of 60 parts to 40 parts of a particle form linear ethylene copolymer containing 2% butene-1. There was also added about 2% by weight of the polymers of azodicarbonamide (obtained under the trademark Celogen AZ) as blowing agent and the resulting composition mixed on a rubber mill for about 5 minutes at a temperature of 300°F. The resulting composition was sheeted out, divided into pellets, and fed to the hopper of one of two single screw extruders connected in series. The composition passed through the extruders at a temperature of about 400°F. could be continuously extruded at a die temperature of 270°–80°F. through a ¼ inch die to produce a very fine celled plastic foam rod having a density of about 0.2 g/cc.

EXAMPLE 21

Example 20 was repeated except that the composition contained the polyethylene-butyl rubber block copolymer admixed with the polyethylene in a weight ratio of 9 to 1. Extrusion of the foamable composition through a ¼ inch die produced a foam rod of good cell structure and density of about 0.5 g/cc.

Although certain preferred embodiments of the invention have been disclosed for purpose of illustration, it will be evident that various changes and modifications may be made therein without departing from the scope and spirit of the invention.

I claim:

1. A process for producing a grafted block copolymer composition which comprises forming an intimate mixture comprising:

A. from about 40 to 99 parts by weight of an unsaturated olefin polymer selected from the group consisting of polyethylene, polypropylene and polybutene-1;

B. correspondingly from about 1 to about 60 parts by weight of an unsaturated, uncured synthetic rubber selected from the group consisting of butyl rubber, copolymers of butadiene and styrene containing 50 to 95% butadiene, copolymers of butadiene and acrylonitrile containing 40 to 95% butadiene, polybutadiene, and terpolymers of ethylene, propylene and a diolefin; and C. at least 0.3% by weight of said olefin polymer and synthetic rubber of a bifunctional phenol aldehyde condensate where the functional groups are hydroxy or halogen in ortho positions, and heating said mixture at a temperature between about 250°F. to about 425°F. to form a copolymer in which the synthetic rubber is grafted to said olefin polymer whereby said composition is free of substantial amounts of crosslinked rubber.

2. The process of claim 1 wherein the degree of unsaturation of the rubber is insufficient to cause substantial cross-linking.

3. The process of claim 2 in which the synthetic rubber is present in an amount between about 10 to 55 parts by weight.

4. The process of claim 3 in which the olefin polymer is polyethylene having a molecular weight of at least 8000 and containing no more than 3% of another alpha-olefin copolymerized therewith.

5. The process of claim 4 in which the polyethylene has a molecular weight of at least 20,000.

6. The process of claim 5 wherein the polyethylene has from about 0.05 to 0.5% unsaturation and the synthetic rubber has from 1 to 5% unsaturation.

7. The process of claim 6 in which the synthetic rubber is butyl rubber.

8. A grafted block copolymer comprising (A) a polyolefin selected from the group consisting of polyethylene, polypropylene and polybutene-1 and (B) a synthetic rubber grafted to said polyolefin through a bifunctional phenol aldehyde condensate wherein the functional groups are hydroxy or halogen in ortho positions, said synthetic rubber being present in the copolymer in amounts of from about 1 to about 50% by weight of the copolymer and selected from the group consisting of butyl rubber, copolymers of butadiene and styrene containing 50 to 95% butadiene, copolymers of butadiene and acrylonitrile containing 40 to 95% butadiene, polybutadiene, and terpolymers of ethylene, propylene and a diolefin.

9. The grafted block copolymer of claim 8 wherein the polyolefin is polyethylene containing no more than about 3% of another alpha-olefin copolymerized therewith and having a molecular weight of at least 8000 prior to grafting.

10. The grafted block copolymer of claim 9 wherein the amount of grafted synthetic rubber is between about 5% and 30% by total weight of the copolymer.

11. The grafted block copolymer of claim 10 wherein the synthetic rubber is butyl rubber.

12. Plastic foam of the grafted block copolymer of claim 9.

13. A composition comprising 2 to 90% by weight of the grafted block copolymer of claim 9 and correspondingly 10 to 98% by weight of a linear polyethylene having a density of at least 0.94.

14. The composition of claim 13 wherein the grafted block copolymer is present in an amount between about 8% to 75% by weight and comprises butyl rubber grafted to a branched polyethylene having density less than 0.94, and in which the linear polyethylene is present correspondingly in an amount between 25 to 92%.

15. Plastic foam of the composition of claim 14.

16. The copolymer of claim 8 including 10 to 80 parts of conductive carbon black per 100 parts of weight of the grafted block copolymer.

17. The copolymer of claim 11 including 10 to 80 parts of conductive carbon black per 100 parts by weight of the grafted block copolymer.

18. A curable composition comprising a blend of (1) a polyolefin selected from the group consisting of polyethylene, stereoregular polypropylene and polybutene-1, (2) a synthetic rubber selected from the group consisting of butyl rubber, copolymers of butadiene and styrene containing 50 to 95% butadiene, copolymers of butadiene and acrylonitrile containing 40 to 95% butadiene, polybutadiene and terpolymers of ethylene, propylene and a diolefin, and (3) a halogenated or hydroxylated phenol-aldehyde resin, said synthetic rubber being present in an amount of about 1 to about 30 wt. percent, based on the amount of synthetic rubber plus polyolefin and said resin being present in an amount of about 1 to about 1500 parts per 100 parts of synthetic rubber.

19. A curable composition comprising a blend of an EPDM elastomer, stereoregular polypropylene and a halogenated phenol-aldehyde resin, said elastomer being present in an amount of about 1 to about 30 wt. percent, based on the amount of elastomer plus polypropylene and said resin being present in an amount of about 1 to about 1500 parts, per 100 parts of elastomer.

20. A composition comprising a blend of an EPDM elastomer, stereoregular polypropylene and a halogenated phenol-aldehyde resin, said elastomer being present in an amount of about 1 to about 30 wt. percent, based on the amount of elastomer plus polypropylene and said resin being present in an amount of about 1 to about 1500 parts, per 100 parts of elastomer.

21. A grafted block copolymer comprising (A) a polyolefin selected from the group consisting of polyethylene, polypropylene and polybutene-1 and (B) a synthetic rubber grafted to said polyolefin through a bifunctional phenol aldehyde condensate wherein the functional groups are hydroxy or halogen in ortho positions, said synthetic rubber being present in the copolymer in amounts of from about 1 to 30% by weight of the copolymer and selected from the group consisting of butyl rubber, copolymers of butadiene and styrene containing 50 to 95% butadiene, copolymers of butadiene and acrylonitrile containing 40 to 95% butadiene, polybutadiene and terpolymers of ethylene, propylene and a diolefin.

22. The copolymers of claim 8 wherein said condensate is a brominated hydroxymethyl phenol.

* * * * *